US008952844B1

(12) United States Patent
Wasiewicz

(10) Patent No.: US 8,952,844 B1
(45) Date of Patent: Feb. 10, 2015

(54) SYSTEM AND METHOD FOR ADAPTIVELY MATCHING THE FREQUENCY RESPONSE OF MULTIPLE CHANNELS

(75) Inventor: Richard Wasiewicz, Tully, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 510 days.

(21) Appl. No.: 13/336,414

(22) Filed: Dec. 23, 2011

(51) Int. Cl.
 G01S 13/534 (2006.01)
 G01S 13/524 (2006.01)
 H04L 25/03 (2006.01)

(52) U.S. Cl.
 CPC ... *G01S 13/5244* (2013.01); *H04L 2025/03605* (2013.01)
 USPC .............. 342/159; 342/162; 342/16; 375/346

(58) Field of Classification Search
 CPC ................... H04B 1/1036; H04L 2025/03605; G01S 13/5244
 USPC ............................ 342/16, 89, 101, 159, 162
 See application file for complete search history.

(56) References Cited

U.S. PATENT DOCUMENTS

| | | | |
|---|---|---|---|
| 3,456,198 A | 7/1969 | Black | |
| 4,853,903 A | 8/1989 | Linville, Jr. et al. | |
| 5,051,963 A | 9/1991 | Linville, Jr. et al. | |
| 5,600,326 A | 2/1997 | Yu et al. | |
| 6,529,568 B1 | 3/2003 | Richards et al. | |
| 7,453,963 B2 | 11/2008 | Joublin et al. | |
| 7,492,668 B2 | 2/2009 | Chang et al. | |
| 7,546,105 B2 * | 6/2009 | Piirainen | 455/278.1 |
| 7,801,248 B2 * | 9/2010 | Challa et al. | 375/316 |
| 7,840,384 B2 | 11/2010 | Feldhaus et al. | |
| 8,207,887 B2 * | 6/2012 | Goldman | 342/25 A |
| 8,320,504 B2 * | 11/2012 | Peng et al. | 375/327 |
| 2002/0071508 A1 * | 6/2002 | Takada et al. | 375/346 |
| 2002/0122473 A1 * | 9/2002 | Leblond et al. | 375/148 |
| 2002/0141518 A1 * | 10/2002 | Piirainen | 375/346 |
| 2002/0171584 A1 | 11/2002 | Walker et al. | |
| 2003/0117314 A1 | 6/2003 | Yu | |
| 2004/0228426 A1 * | 11/2004 | Oh et al. | 375/346 |
| 2006/0062184 A1 | 3/2006 | Saarnisaari et al. | |
| 2008/0089451 A1 * | 4/2008 | Taylor et al. | 375/346 |

(Continued)

OTHER PUBLICATIONS

Kumaravel, N. and Nithiyanandam, N., "Genetic-algorithm cancellation of sinusoidal powerline interference in electocardiograms", Journal: Medical & Biological Engineering & Computing, Mar. 1998;36(2):191-6.

(Continued)

*Primary Examiner* — John B Sotomayor
*Assistant Examiner* — Marcus Windrich
(74) *Attorney, Agent, or Firm* — Howard IP Law Group, PC

(57) ABSTRACT

A method for adaptively matching the frequency response of two channels of a received signal includes the steps of receiving a main RF signal on a main antenna, sampling the main RF signal at a sample rate, delaying the sampled main RF signal by a multiple of a sample period, wherein the sample period is the inverse of the sample rate, receiving at least one other RF signal on at least one other auxiliary antenna, sampling each of the at least one other RF signal at the sample rate, filtering each of the at least one other sampled RF signal utilizing an adaptive finite impulse response (FIR) filter having at least one sub-sample-period time delay, and combining the sampled main RF signal with each of the filtered at least one other sampled RF signals.

11 Claims, 5 Drawing Sheets

(56) References Cited

U.S. PATENT DOCUMENTS

2009/0285343 A1* 11/2009 Kolze et al. .................. 375/346
2010/0197233 A1 8/2010 Kim et al.
2010/0296568 A1 11/2010 Bury

OTHER PUBLICATIONS

So, H.C., "A Novel Adaptive Algorithm for Sinusoidal Interference Cancellation", Department of Electric Engineering, pp. 1-8, Oct. 14, 1997.
International Search Report dated Sep. 24, 2012, for International Application No. PCT/US12/42496.
North, Richard C., Zeidler, James R., Albert, Terrance R., Ku, Walter H., "Comparison of Adaptive Lattice Filters to LMS Transversal Filters for sinusoidal Cancellation". IEEE, pp. IV-33-IV-36, 1992.
Xu, Lijun and Yan, Yong, "Wavelet-based removal of sinusoidal interference from a signal", Measurement Science Technology, 15 (2004), 1779-1786.
So, H.C., "Adaptive cancellation of multiple interfering sinusoids", Electronics Letters, vol. 34, No. 24, Nov. 26, 1998.
Abdelkefi, F. et al.: "Impulse noise cancellation in multicarrier transmission"; 2001 IEEE International Conference on Acoustics, Speech, and Signal Processing, 2001. Proceedings; p. 2381-2384 vol. 4.
Yu, Xunyi et al.; "OFDM Channel Estimation with Impulse Noise Cancellation"; International Conference on Wireless Communications, Networking and Mobile Computing, 2007; WiCom 2007; Oct. 8, 2007; p. 330-333; Shanghai.
Kerpez, KJ, "Minimum mean squared error impulse noise estimation and cancellation"; IEEE Transactions on Signal Processing; Jul. 1995; vol. 43, Issue; 7; p. 1651-1662.
Zhang, D. et al., "Impulse Noise Detection and Removal Using Fuzzy Techniques"; Electronics Letters; Feb. 27, 1997; vol. 33, Issue 5; p. 378-379.
Pelletier, MG, "Adaptive signal processing for removal of impulse noise from yield monitor signals"; http//hdl.handle.net/10113/12584 USDA, ARS; Journal of cotton science 2001. v.5(4), p. 224-233.
International Search Report dated Sep. 21, 2012, for International Application No. PCT/US12/40532.

* cited by examiner

SYSTEM AND METHOD FOR ADAPTIVELY MATCHING THE FREQUENCY RESPONSE OF MULTIPLE CHANNELS

FIELD OF THE INVENTION

This invention relates generally to radar systems and more particularly, to adaptive digital signal processing and channel frequency response matching.

BACKGROUND OF THE INVENTION

Radar systems typically use digital signal processing to cancel interfering (e.g. jamming) signals from a main channel of a radar array by adaptively weighting sampled demodulated outputs of one or more auxiliary channels and subtracting them from the main channel's output. Deep cancellation of jamming signals, however, requires that the frequency responses of the main and auxiliary channels be highly matched across the instantaneous bandwidth. Fixed amplitude and phase offsets do not limit cancellation. Frequency-dependent channel-to-channel mismatches, however, do limit cancellation. These frequency-dependent mismatches may include amplitude ripple, phase ripple, linear amplitude slope, and linear phase slope, by way of example only. A single adaptive weight in each auxiliary channel can provide adequate cancellation at the center of the instantaneous bandwidth, however, the net cancellation may be inadequate if the bandwidth and post-calibration frequency-dependent mismatches are sufficiently large.

Mismatch across a broad instantaneous bandwidth may be mitigated by Implementing an equalizer at the output of each channel's digital demodulator to compensate for passband mismatches that are either constant or that change very slowly over long periods of time as the equipment ages or changes temperature. An equalizer may be a finite impulse response (FIR) filter, operating at the in-phase/quadrature (I/Q) sample rate, and operative to modify the frequency response of each channel so that all channel responses approximately match a common reference response shape. However, conventional channel equalization cannot adequately account for the difference in time delay between the jammer signal in one channel and the jammer signal in every other channel because these delays continually differ as the radar rotates.

A conventional solution to this problem is to replace the single adaptive weight in each auxiliary channel with an adaptive FIR filter that implements a complex adaptive weight in each tap. Adaptive computation of these weights will then automatically match the various channel responses to maintain deep cancellation across the instantaneous bandwidth, despite changing jammer angles due to array rotation. Typically, the total duration of the FIR is chosen to be greater than the inverse of the shortest expected passband ripple period. The total number of taps is then given by this time duration divided by the I/Q sample period T. Depending on the shortest ripple period expected, a large number of taps may be required, with each tap requiring an adaptive weight. The large number of taps needed to handle a combination of slow and fast mismatches increases computational complexity and requires a large amount of jammer signal data to adequately train the adaptive weights. Alternative techniques are desired.

SUMMARY OF THE INVENTION

An embodiment of the present invention involves a method for adaptively matching the frequency response of one signal channel to one or more other signal channels using a number of sample-period delays and a number of sub-sample period delays that are less than the sample period delays. The method includes the steps of delaying the one signal channel by an integer multiple of the sample period, filtering each other signal channel utilizing an adaptive filter having at least one sub-sample-period (SSP) time delay, and combining the sampled one signal channel with each of the filtered other signal channels.

An embodiment of the present invention also involves a system for adaptively matching the frequency response of multiple channels, including a main channel configured to receive a main data stream and to output a main I/Q data stream at a given sample rate. At least one auxiliary channel is configured to receive one or more jamming signals to be removed from the main I/Q data stream and to output an auxiliary I/Q data stream at the given sample rate. A sub-sample period adaptive filter for each auxiliary channel is configured to receive the auxiliary I/Q data stream and output a matched I/Q data stream, and a cancellation node is configured to cancel the one or more jamming signals from the main I/Q data stream.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements found in typical adaptive processing systems and methods (e.g. radar systems). However, because such elements are well known in the art, and because they do not facilitate a better understanding of the present invention, a discussion of such elements is not provided herein.

Figure 1:
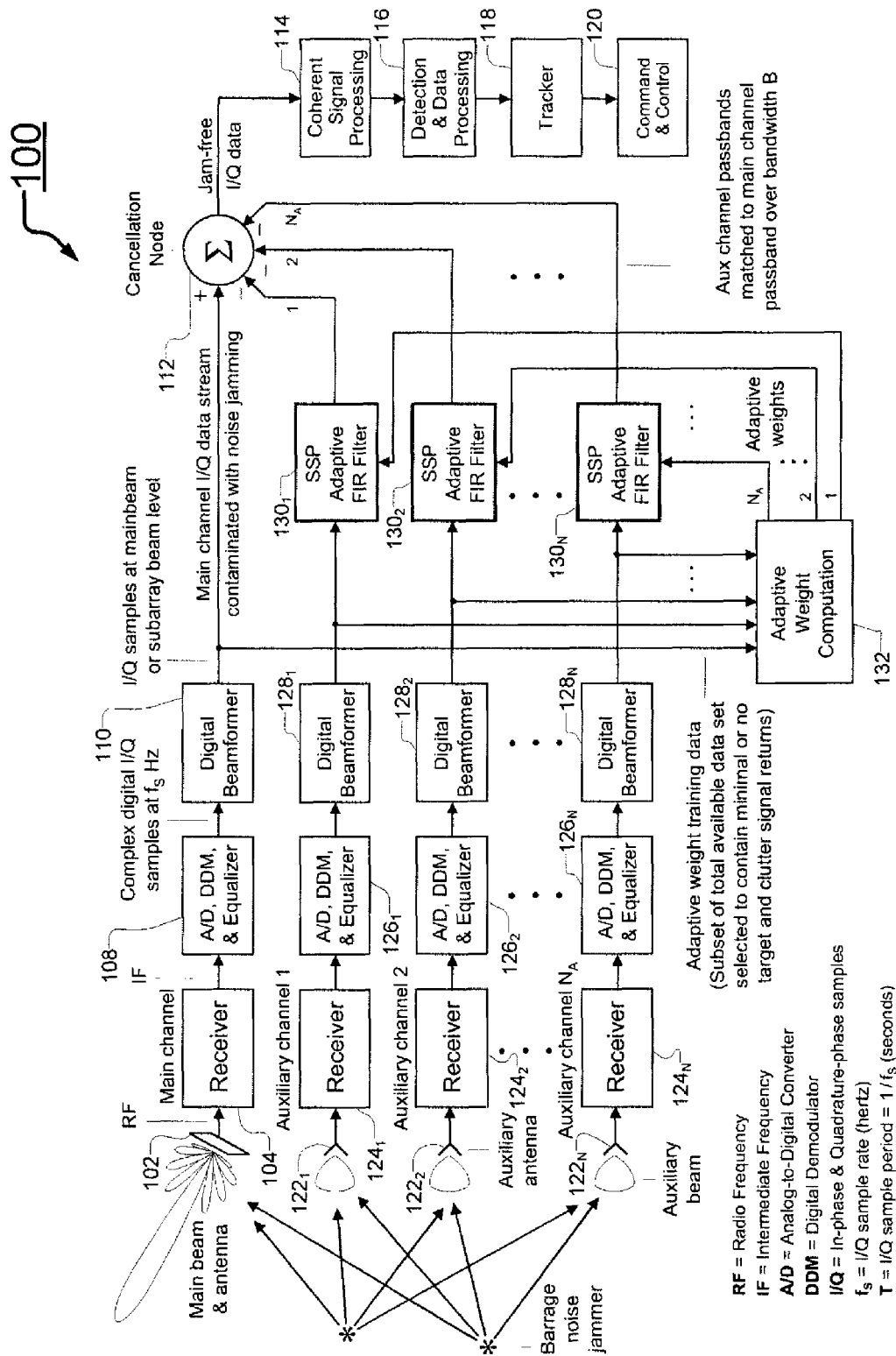
FIG. 1 shows a block diagram of an adaptive radar system having one or more sub-sample-period filters according to an embodiment of the present invention.

FIG. 1 shows an adaptive radar system 100 according to an embodiment of the present invention. Adaptive radar system 100 includes a main antenna 102, such as a phased array antenna, configured to transmit and receive radar signals and to output received radio frequency (RF) echo signals to a downstream main channel receiver 104. Main channel receiver 104 may be a typical radar receiver configured to receive RF signals from main antenna 102, amplify the received signals, and output intermediate frequency (IF) signals to downstream signal processing components illustrated collectively in FIG. 1 as main processing block 108. Main processing block 108 may include one or more typical radar processing components/devices configured to receive IF signals from the main receiver, perform analog-to-digital (A/D) conversion, digital demodulation (DDM), and equalization (i.e. channel matching), and to output I/Q samples at an I/Q sample rate of (fs) hertz (Hz) to a downstream main digital beamformer 110. Main digital beamformer 110 may be a typical digital beamformer configured to receive I/Q samples at $f_S$ Hz and to output an I/Q data stream from the main beam or subarray beam to a downstream noise cancellation node 112. In the exemplary embodiment, the I/Q sample rate $f_S$ Hz may be about 25% greater than the bandwidth of the channel (e.g. $f_S$=5 megahertz (MHz) for a radar system with a 4 MHz bandwidth).

Adaptive radar system 100 also includes one or more auxiliary channels (1, 2, . . . , N) useful for cancelling out noise or jamming signals received on the main channel. Each auxiliary channel includes an auxiliary antenna $122_i$ (where i=1, . . . , N) configured to receive target free and clutter free signals and to output RF signals to a downstream auxiliary receiver $124_i$ (where i=1, . . . , N). Auxiliary antennas $122_i$ may be separate antennas from main antenna 102 or they may be subarrays of the main antenna. In an exemplary embodiment, each subarray could be the entire antenna aperture with the only difference between the main and auxiliary channels being the beam shaping and steering weights applied to the array elements (i.e. one set of weights is applied to form the main beam and another set is applied in parallel to form an auxiliary beam). In an alternative exemplary embodiment, each subarray may comprise only a single array element. Each auxiliary receiver $124_i$ may be a typical radar receiver configured to receive RF signals from an auxiliary antenna $122_i$, amplify the received signals, and output IF signals to downstream signal processing components, illustrated collectively in FIG. 1 as auxiliary processing block 126, (where i=1, . . . , N). Auxiliary processing block $126_i$ may include one or more typical radar processing components/devices configured to receive IF signals from the main receiver, perform A/D conversion, DDM, and equalization (i.e. channel matching), and to output I/Q samples at a sample rate of $f_S$ Hz to a downstream auxiliary digital beamformer $128_i$ (where i=1, . . . , N). Auxiliary digital beamformer $128_i$ may be a typical digital beamformer configured to receive I/Q samples at $f_S$ Hz and to output an I/Q data stream downstream to both an adaptive weight computation device 132 and a sub-sample-period (SSP) adaptive filter such as finite impulse response (FIR) filter $130_i$ (where i=1, . . . , N).

Adaptive weight computation device 132 is a processing component configured to receive a subset of the total available I/Q data stream selected to contain minimal or no target returns and clutter signal returns and to output a plurality of adaptive weights to each of N downstream SSP adaptive FIR filters $130_i$. By way of example, adaptive weight computation device 132 may be configured to receive I/Q data streams only during relatively short "listening windows" occurring immediately before each transmit pulse, thereby minimizing or eliminating target returns and clutter signal returns caused by transmissions from the main channel. The frequency at which adaptive weight computation device 132 computes adaptive weights depends on aspects of the radar system. For example, in a fixed radar adaptive weights may be calculated relatively infrequently (e.g. once per coherent integration period (CIP)). Alternatively, in a rotating radar, adaptive weights may require updating during a CIP (e.g. at the pulse repetition frequency (PRF)). The processing performed by adaptive weight computation device 132 is discussed below with reference to FIG. 4.

Each SSP adaptive FIR filter 130 is a processing component configured to receive both an I/Q data stream at a frequency of $f_S$ Hz and one or more adaptive weights. Each SSP adaptive FIR filter adaptively matches the frequency response of the I/Q data stream to that of the main channel I/Q data stream using a number of sample period delays and a number of sub-sample period delays (less than the sample period delays), for output to downstream noise cancellation node 112. The processing performed by SSP adaptive FIR filter $130_i$ is discussed below with reference to FIG. 2.

Cancellation node 112 may be a typical adder configured to receive a main channel I/Q data stream contaminated with components of jamming signal noise, and one or more auxiliary channel I/Q data streams configured to output the various jamming signal components of the main channel. The auxiliary channel I/Q data streams from the main channel I/Q data stream, and cancellation node 112 outputs to downstream components a jam-free I/Q data stream 113. Further downstream components may include typical radar components, such as by way of example only a coherent signal processor 114, a detection and data processor 116, a tracker 118, and a command and control processor 120.

FIG. 1 shows SSP adaptive FIR filters $130_i$ implemented in a digital beamforming radar. It should be clear to those of skill in the art, however, that the SSP adaptive FIR filters $130_i$ may be similarly implemented in a conventional radar (e.g. a radar having main digital beamformer 110 upstream in the I/Q sample flow from main processing block 108). Additionally, while the adaptive radar system 100 of FIG. 1 performs equalization in the main processing block 108 prior to digital beamforming in main digital beamformer $110_i$ alternative embodiments of the present invention may omit equalization prior to digital beamforming and include a more general SSP adaptive FIR filter $130_i$ in each auxiliary channel. In such an embodiment, SSP adaptive FIR filter $130_i$ may comprise at least several sample-periods and SSP adaptive weights.

Figure 2:
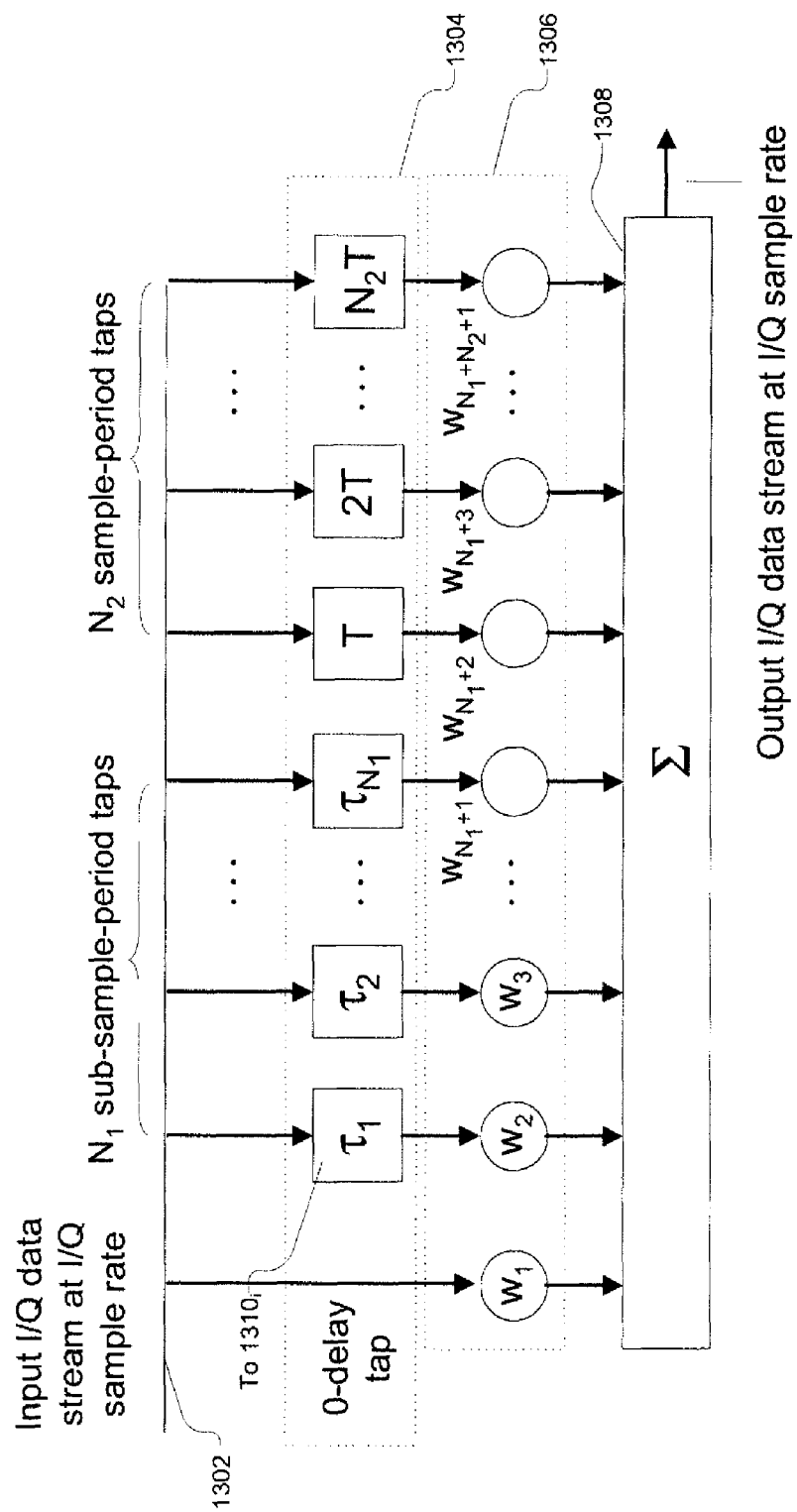
FIG. 2 shows a block diagram of functional components of a sub-sample period adaptive filter of FIG. 1 where T is the I/Q sample period and $\tau_1$ through $\tau_{N1}$ are sub-sample-period time delays that are less than T and the $W_1, W_2, \ldots$, are complex adaptive weights.

FIG. 2 shows an SSP adaptive FIR filter $130_i$ discussed above with reference to FIG. 1. SSP adaptive FIR filter $130_i$ is configured to receive at input 1302 I/Q samples at $f_S$ Hz from a corresponding auxiliary digital beamformer $128_i$ (shown in FIG. 1). A tapped delay line 1304 delays the I/Q sample stream before the I/Q sample stream is multiplied by each of complex adaptive weights $w_i$ indicated generally as 1306 (where i=1, 2, 3, . . . , $N_1$+$N_2$+1). Complex adaptive weights $w_i$ are trained by adaptive weight computation device 132 (discussed below with reference to FIG. 4). The products of multiplying the I/Q sample stream by each $w_i$ are then summed together by a summer 1308. Summer 1308 outputs to the downstream noise cancellation node 112 (FIG. 1) the I/Q sample streams whose channel passband is matched in the sense that the complex frequency response (i.e., amplitude and phase) across the passband has substantially the same shape as the main channel's frequency response over the same passband to within a predetermined tolerance.

The tap delay line may include a zero delay tap, $N_1$ SSP taps ($\tau$), and $N_2$ sample-period taps (T=1/$f_S$). The SSP taps $\tau$ may be significantly less in duration than T. By way of example, in one embodiment of SSP adaptive FIR filter $130_i$, T may be 200 nanoseconds (ns) and accordingly 2T may be 400 ns. However, $\tau_1$ may be about one nanosecond (ns) and $\tau_2$ may be two nanoseconds. Thus, a sub-sample-period τ may be hundreds of times smaller than sample-period T. An all-pass M-tap $f_S$ Hz FIR filter $1310_i$ whose frequency response closely approximates unit gain and linear phase slope across the radar's instantaneous bandwidth may be implemented for delaying the sampled I/Q data stream by τ. An exemplary FIR filter $1310_i$ is discussed with reference to FIG. 3 below.

It should be understood by one of ordinary skill in the art that the delays τ and T shown in FIG. 2 (and in FIGS. 3 and 4 below) are relative delays. Each SSP adaptive FIR filter $130_i$ additionally has a bulk delay, and all I/Q data streams are delayed by this bulk delay to render delays of τ and T delays relative to the main channel.

Various applications of the SSP adaptive FIR filter $130_i$ may require a mix of SSP taps and sample-period taps as shown, while other applications may require only SSP taps. By way of example only, an SSP adaptive FIR filter $103_i$ configured to replace fixed channel equalization and support adaptive processing, may need a wide range of tap delays to accommodate both slow and fast variations of the multiple channel responses. By way of alternative example, an SSP adaptive FIR filter $103_i$ may be configured in an adaptive radar system 100 having fixed equalization to remove most of the frequency-response variations from the multiple channels, leaving only time delay differences due to the changing aspect angle of the radar antenna relative to a set of jammers as the radar rotates. Such an SSP adaptive FIR filter $103_i$ may need only a single SSP tap to adaptively match the changing time delays.

Figure 3:
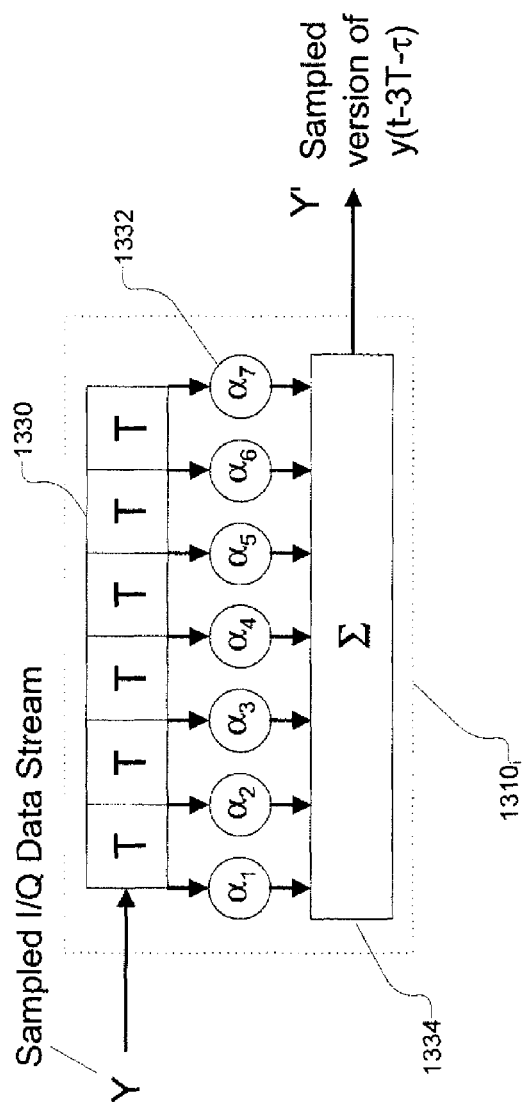
FIG. 3 shows a block diagram of functional components of an exemplary all-pass 7-tap FIR filter configured to delay a received data stream by $3T+\tau$ according to an embodiment of the present invention where $\tau$ is a sub-sample-period time delay and $\alpha_1$ through $\alpha_7$ are real weights.

FIG. 3 shows an exemplary all-pass 7-tap $f_S$ Hz FIR filter $1310_i$ whose frequency response closely approximates unit gain and linear phase slope across the radar's instantaneous bandwidth. FIR filter $1310_i$ is configured to receive at an input a sampled I/Q data stream Y. The sampled I/Q data stream Y is representative of an analog signal y(t) sampled at a given sample period T. The FIR filter receives the sampled I/Q data stream and generates at its output a sampled "version" Y' of the analog signal y (t−3T−τ). This sampled version Y' has the same sample period T, but the underlying analog signal has been shifted in time by the bulk delay (e.g. 3T) and the targeted timed delay (e.g. τ). In the illustrated embodiment, the system is configured to output the same sampled I/Q data stream delayed by 3T+τ, with 3T being the bulk delay and τ being the delay relative to the main channel, where τ is on the order of hundreds of times smaller than the sample period (τ<<T).

Referring still to FIG. 3, FIR filter 1310 includes seven sample period (T) delays 1330. The delayed sampled I/Q data stream is multiplied by fixed real weights 1332 (details of selection of fixed real weights be $\alpha_1$–$\alpha_7$ designated as 1332 is discussed with reference to FIG. 5 below). The results of the multiplication with the fixed real weights 1332 are added by summer 1334, which outputs a sampled I/Q data stream delayed from the input by 3T+τ. By delaying the main channel I/Q data stream by 3T (i.e. the bulk delay of the exemplary all-pass 7-tap $f_S$ Hz FIR filter $1310_i$), a delay in the auxiliary channel relative to the main channel of τ is thereby achieved.

Alternative embodiments of the present invention may implement any M-tap I/Q $f_S$ Hz FIR filter $1310_i$ whose frequency response closely approximates unit gain and linear phase slope across the radar's instantaneous bandwidth. M must be chosen to be an odd integer. Thus, if the phase slope dφ/df across the radar's instantaneous bandwidthl is 2π, the group delay of the filter will be ((M−1)/2)T+τ. The linear phase in the frequency domain is equivalent to a time delay in the time domain. Thus, the main channel may be delayed by (M−1)/2 multiples of T, thereby achieving a delay in the auxiliary channel relative to the main channel of τ. It is appreciated by one of ordinary skill in the art that negative delays may be produced by an M-tap I/Q $f_S$ FIR filter $1310_i$ since τ represents a relative time increment.

Figure 4:
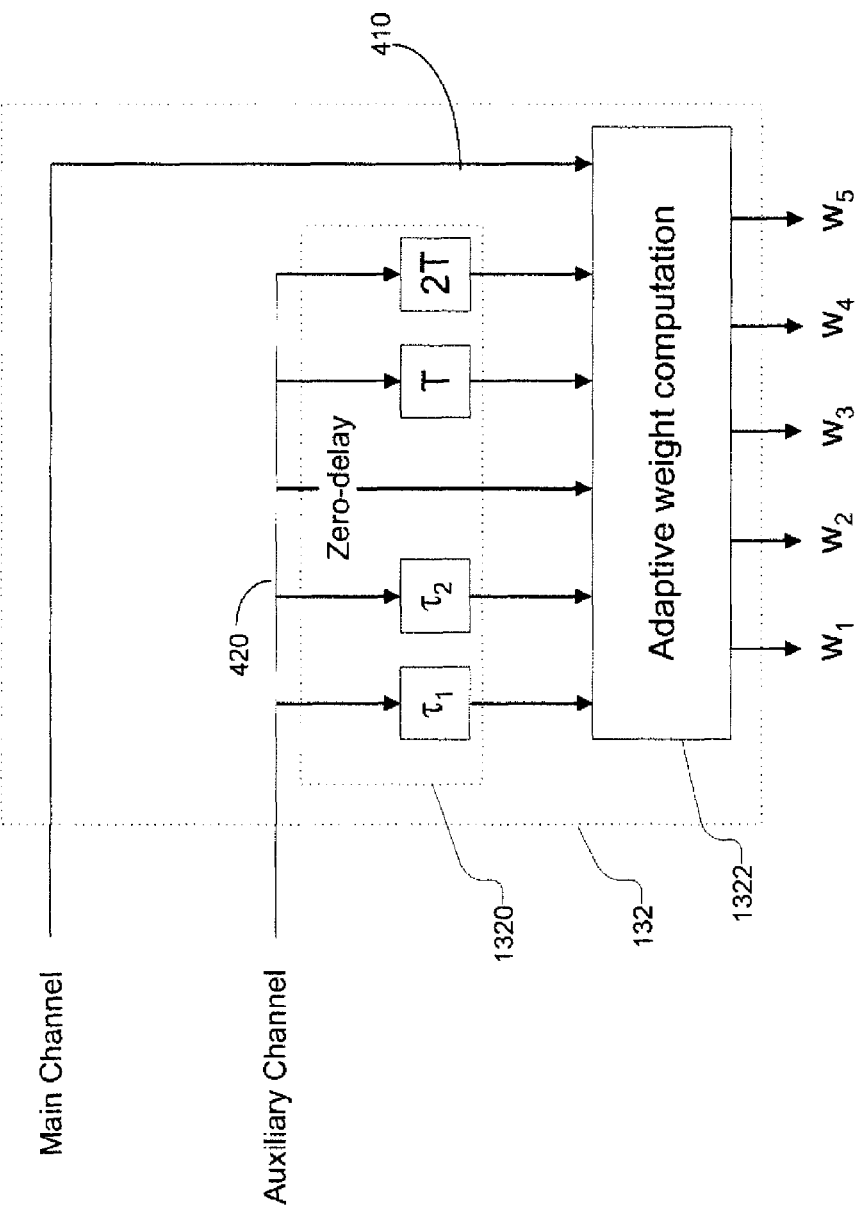
FIG. 4 shows a block diagram of functional components of an exemplary adaptive weight computation device for the adaptive radar system of FIG. 1 having a single auxiliary channel (i.e. N=1) according to an embodiment of the present invention.

Referring now to FIG. 4, an exemplary adaptive weight computation device 132 is shown for an adaptive radar system of FIG. 1 having a single auxiliary channel (i.e. N=1). Adaptive weight computation device 132 is configured to receive at an input an I/Q data stream from the main digital beamformer 110 as well as an I/Q data stream from the auxiliary digital beamformer $128_i$. The streams from the main digital beamformer 110 and from auxiliary digital beamformer $128_i$ are configured to receive target-free and clutter-free interference-plus-noise I/Q samples. The input I/Q data stream 410 from the main channel may be input into an adaptive weight computation processor 1322 without any time delay. The input I/Q data stream 420 from the auxiliary channel may be input into a tap delay line 1320 which may include a zero-delay tap, SSP taps (τ), and sample-period taps (T). The delay tap τ may be significantly less than period T (e.g. on the order of hundreds of times smaller than period T). In embodiments of adaptive weight computation devices 132, tap delay line 1320 may be the same as tap delay line 1304 discussed with reference to FIG. 2 above. Tap delay line 1320 outputs time delayed I/Q data streams into adaptive weight computation processor 1322. It should be understood by those of skill in the art that each I/Q data stream is additionally delayed by a bulk delay (greater than T), as discussed with reference to FIG. 2 above. This bulk delay is an integer multiple of T and is a consequence of the generation of the subsample period delays (τ), wherein the main channel I/Q data stream is delayed by the bulk delay so as to provide a net or relative delay of (τ), between the channels (relative delay of the auxiliary channel I/Q data streams with respect to the main channel I/Q data stream).

Adaptive weight computation processor 1322 may be a conventional processor comprising hardware, software, firmware, or any combination thereof. Adaptive weight computation processor 1322 may implement one of numerous known algorithms selected to train the adaptive weights prior to interference cancellation. Adaptive weight computation is well known in the field of adaptive processing, the details of which are omitted herein for purposes of brevity. Adaptive weight computation processor 1322 outputs one or more adaptive weights $w_i$ to SSP adaptive FIR filter $130_1$.

In alternative embodiments of the present invention, adaptive weight computation device 132 may be configured to receive inputs from main digital beamformer 110 and from N auxiliary digital beamformers $128_{(1-N)}$. Such an adaptive weight computation device 132 would be configured to compute one or more adaptive weights for each respective input from an auxiliary digital beamformer $128_i$ and output to a respective SSP adaptive FIR filter $130_i$ the one or more adaptive weights.

Figure 5:
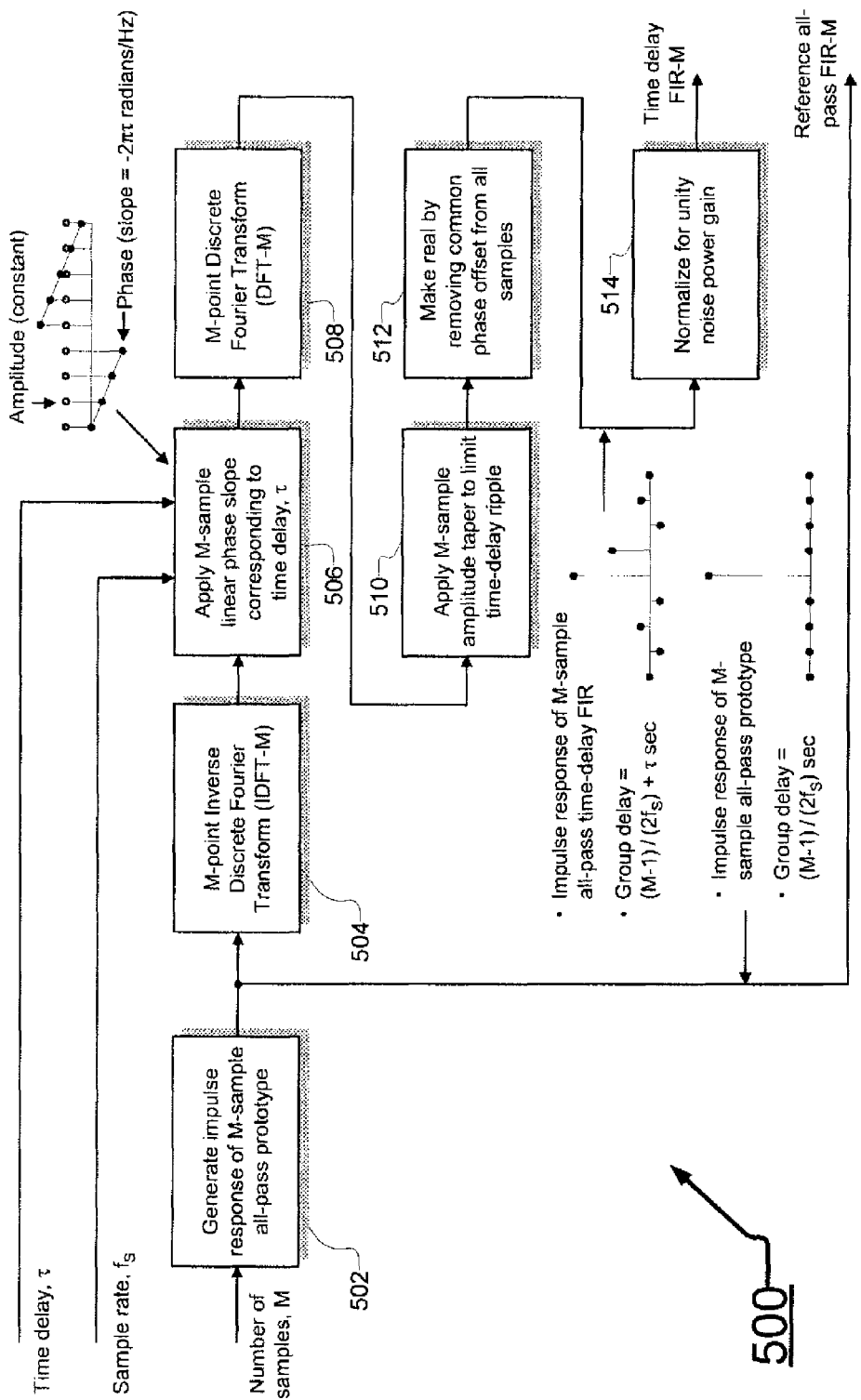
FIG. 5 shows a process flow for a sub-sample-period adaptive FIR filter suitable for use by the adaptive radar system of FIG. 1 according to an embodiment of the present invention.

Referring now to FIG. 5, there is shown a process flow for generating the fixed weights be $\alpha_1$–$\alpha_7$ suitable for use by the adaptive FIR filter in FIG. 2 to create the SSP delays $\tau_1$, $\tau_2$, ..., $\tau_n$. This architecture produces an M-sample all-pass time-delay FIR with real coefficients and a group delay equal to (M−1)/2 I/Q sample periods plus τ, where τ need not be an integer multiple of the I/Q sample period (i.e. τ may be a SSP). A relative time delay of τ is created by filtering the I/Q data stream to be delayed through the time delay FIR and delaying all other relevant channels by (M−1)/2 I/Q sample periods (i.e. the bulk delay of (M−1)/2 I/Q samples).

At step 502, an M-sample all-pass prototype FIR filter A is created where M is an odd integer. The prototype FIR filter is an all-pass filter, meaning that the I/Q data stream is not modified, but only delayed. The prototype FIR filter A includes (M−1)/2 real weights of zero, a real weight of one, and (M−1)/2 additional real weights of zero. Accordingly, the prototype FIR filter only functions to delay the I/Q data stream by (M−1)/2 samples (i.e. the group delay). At step 504, an M-point inverse discrete Fourier transform (IDFT) is taken of the M samples, thereby creating a complex output from step 504. At step 506, a linear phase is applied across the M samples. The slope of the linear phase is proportional to the desired or target sub-sample time delay τ (the linear phase slope is a function of $f_S$ and of the time delay τ, thereby creating a phase with slope −2πτ). At step 508, an M-point discrete Fourier transform (DFT) is taken to re-enter the time domain. At step 510, an M-sample amplitude taper is applied to remove discontinuities toward the ends of the sample streams (e.g. the first and last samples), thereby smoothing out the time-delay ripple. At the output of step 510, all of the samples are complex but have a common phase which is irrelevant to the design of the FIR filter. At step 512, the common phase is removed (e.g. by taking only the real components or parts), resulting in all of the samples (i.e. coefficients) being real. At step 514, the M samples are normalized (e.g. a common amplitude adjustment is applied to all of the samples), thereby ensuring that the noise level at the output is the same as the input noise level. The result of the process flow is a filter having a delay of (M−1)/(2$f_S$)+τ (i.e. ((M−1)/2)T+τ). Thus, the process flow of FIG. 5 provides for design of both a bulk delay filter (i.e. the prototype FIR filter) and for the sub-sample-period relative delay filter (i.e. the final product of the process flow providing a delay equal to the bulk delay+the subsample period τ).

Additional benefits of implementing an adaptive radar having SSP adaptive FIR filters include significant reduction in latency and increased numerical stability. Still further, fewer training samples are required because the number of training samples needed to achieve a given level of channel match is proportional to the number of adaptive weights. Finally, enhanced channel match is obtained because a small set of weight training samples is more likely to be statistically stationary than a larger set.

In embodiments of the present invention, such as the adaptive radar system 100 of FIG. 1, N auxiliary channels may be chosen to meet a particular set of requirements. For example, multiple auxiliary channels may be advantageous when the adaptive radar system 100 may encounter multiple simultaneous barrage noise jammers.

Thus, there is disclosed an embodiment of a method for adaptively matching the frequency response of multiple channels of a received radar signal, comprising: receiving a main RF signal on a main antenna; sampling the main RF signal at a given sample rate; delaying the sampled main RF signal by a given bulk delay equal to an integer number of sample periods; receiving at least one other RF signal on at least one other auxiliary antenna associated with the main antenna; sampling each of the at least one other RF signals at the given sample rate; filtering each of the other at least one sampled RF signals utilizing an adaptive finite impulse response (FIR) filter having at least one sub-sample-period time delay less than the sample period of the filtered signal; and combining the sampled main RF signal with each of the filtered other sampled RF signals. The sample period is the inverse of the sample rate. The sub-sample-period delay is on the order of hundreds of times smaller than the sample period delay. The sub-sample-period may be a non-integer multiple of the sample period. Each adaptive FIR filter may further have at least one sample-period delay. Each of the sub-sample-period time delays is generated by one or more fixed weight FIR filters.

In another embodiment a system for adaptively matching the frequency response of multiple channels, comprises: a main channel configured to receive a main data stream and to output a main in-phase/quadrature-phase (I/Q) data stream at a given sample rate; one or more auxiliary channels, each auxiliary channel configured to receive one or more jamming signals to be removed from the main I/Q data stream and to output an auxiliary I/Q data stream at the given sample rate; an M-tap adaptive finite impulse response (FIR) filter for each auxiliary channel configured to receive the auxiliary I/Q data stream and to output an I/Q data stream; the FIR filter having a first set of taps separated by integer multiples of the I/Q sample rate, and a second set of taps separated by sub-sample-period time delays that are less than the I/Q sample period, and wherein the M-tap I/Q sample rate FIR contains M fixed real weights; and an adder configured to sum the output data streams of the main channel and each of the auxiliary channels to cancel the one or more jamming signals from the main I/Q data stream. The matched I/Q data stream has a passband matched to the main channel passband over the instantaneous bandwidth. The sub-sample-period delay is on the order of hundreds of times smaller than the sample period delay.

Furthermore, each of the main and auxiliary channels includes a receiver configured to receive RF signals from the corresponding main and auxiliary antennas, amplify the received signals, and output intermediate frequency (IF) signals. Each of the main and auxiliary channels further includes a digital beamformer downstream of the corresponding receiver.

In a different embodiment, an adaptive finite impulse response (FIR) filter for filtering an I/Q data stream having a sample period, comprises: a plurality of sample-period tap delays configured to delay the I/Q data stream by integer multiples of the sample period of the I/Q data stream; a plurality of sub-sample-period tap delays configured to delay the I/Q data stream by non-integer multiples of the sample period of the I/Q data stream, the sub-sample period tap delays being at least an order of magnitude less than the sample period tap delays; a set of adaptive weights configured to weight samples of the delayed I/Q data stream; and an adder configured to combine the weighted samples of the delayed I/Q data streams to generate a filtered I/Q data stream. The weights of the FIR filter are fixed real weights. The sub-sample-period is a non-integer multiple of the sample period.

In another embodiment, a time delay circuit delays a received I/Q data stream sampled at a sampling rate, comprises a FIR filter comprising an odd integer number of sample period tap delays configured to delay the I/Q data stream, wherein the sample period is the reciprocal of the sampling rate; an odd integer number of fixed real weights configured to weight samples of the delayed I/Q data stream; and an adder configured to combine the weighted samples of the delayed I/Q data stream. The group delay of the FIR filter is ((M−1)/2)T+τ where T is the sample period and τ is the sub-sample period delay.

In a further embodiment, a method for determining a set of fixed real weights for a time delay circuit in a computer system including an M-sample all-pass FIR filter, wherein the M samples include M real weights of zero and a center real weight of one, comprises: performing via a computer processor an M-point inverse discrete Fourier transform of the M samples; applying a liner phase slope corresponding to a time delay; performing via a computer processor an M-point discrete Fourier transform of the M samples; applying an M-sample amplitude taper to the M samples; and removing a common phase offset from the M samples.

While the embodiments of the present invention discussed herein generally refer to adaptive radar systems, the present invention can be applied generally to other applications of adaptive processing requiring channel matching. By way of non-limiting example, the present invention could beneficially be implemented in wireless communications systems, including systems using code division multiple access (CDMA) technology and frequency hopping.

It will be apparent to those skilled in the art that modifications and variations may be made in the method and system of the present invention without departing from the spirit or scope of the invention. It is intended that the present invention cover the modification and variations of this invention provided they come within the scope of the appended claims and their equivalents.

What is claimed is:

1. A method for adaptively matching the frequency response of multiple channels of a received radar signal, comprising:
    receiving a main RF signal on a main antenna;
    sampling the main RF signal at a given sample rate;
    delaying the sampled main RF signal by a given bulk delay equal to an integer number of sample periods;
    receiving at least one other RF signal on at least one other auxiliary antenna associated with the main antenna;
    sampling each of the at least one other RF signals at the given sample rate;
    filtering each of the other at least one sampled RF signals utilizing an adaptive finite impulse response (FIR) filter having at least one sub-sample-period time delay less than the sample period of the filtered signal; and
    combining the sampled main RF signal with each of the filtered other sampled RF signals.

2. The method of claim 1, wherein the sample period is the inverse of the sample rate.

3. The method of claim 2, wherein the sub-sample-period delay is on the order of hundreds of times smaller than the sample period delay.

4. The method of claim 3, wherein the sub-sample-period is a non-integer multiple of the sample period.

5. The method of claim 4, wherein each adaptive FIR filter further has at least one sample-period delay.

6. The method of claim 4, wherein each of the sub-sample-period time delays is generated by one or more fixed weight FIR filters.

7. A system for adaptively matching the frequency response of multiple channels, comprising:
    a main channel configured to receive a main data stream and to output a main in-phase/quadrature-phase (I/Q) data stream at a given sample rate;
    one or more auxiliary channels, each auxiliary channel configured to receive one or more jamming signals to be removed from the main I/Q data stream and to output an auxiliary I/Q data stream at the given sample rate;
    an M-tap adaptive finite impulse response (FIR) filter for each auxiliary channel configured to receive the auxiliary I/Q data stream and to output an I/Q data stream; the FIR filter having a first set of taps separated by integer multiples of the I/Q sample rate, and a second set of taps separated by sub-sample-period time delays that are less than the I/Q sample period, and wherein the M-tap I/Q sample rate FIR contains M fixed real weights; and
    an adder configured to sum the output data streams of the main channel and each of the auxiliary channels to cancel the one or more jamming signals from the main I/Q data stream.

8. The system of claim 7, wherein the matched I/Q data stream has a passband matched to the main channel passband over the instantaneous bandwidth.

9. The system of claim 7, wherein the sub-sample-period delay is on the order of hundreds of times smaller than the sample period delay.

10. The system of claim 7, wherein each of the main and auxiliary channels includes a receiver configured to receive RF signals from the corresponding main and auxiliary antennas, amplify the received signals, and output intermediate frequency (IF) signals.

11. The system of claim 10, wherein each of the main and auxiliary channels further includes a digital beamformer downstream of said corresponding receiver.

* * * * *